United States Patent Office 3,388,752
Patented June 18, 1968

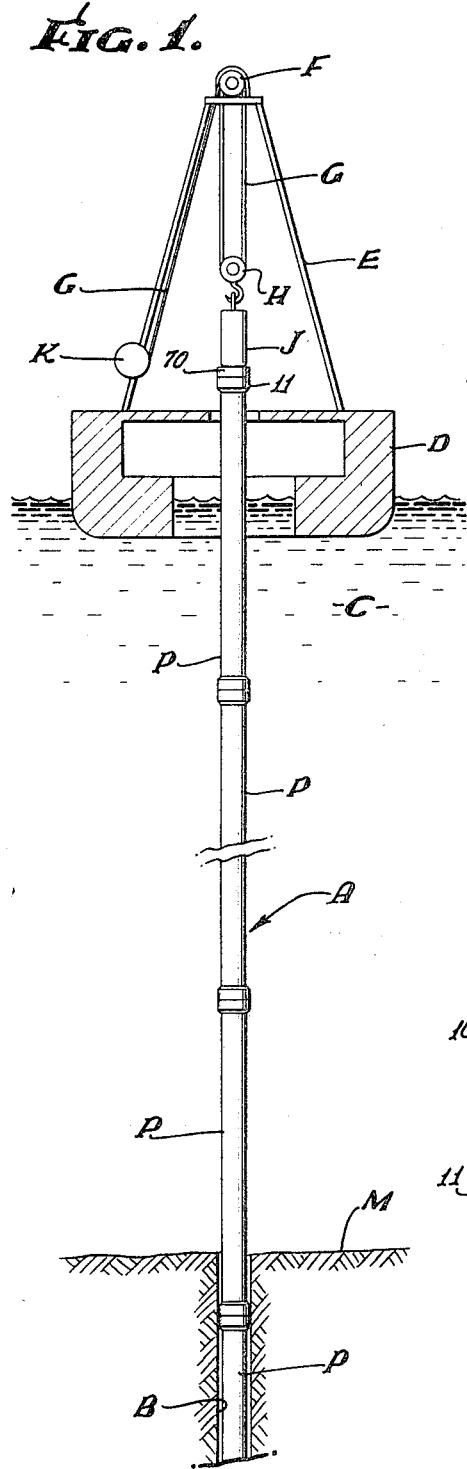
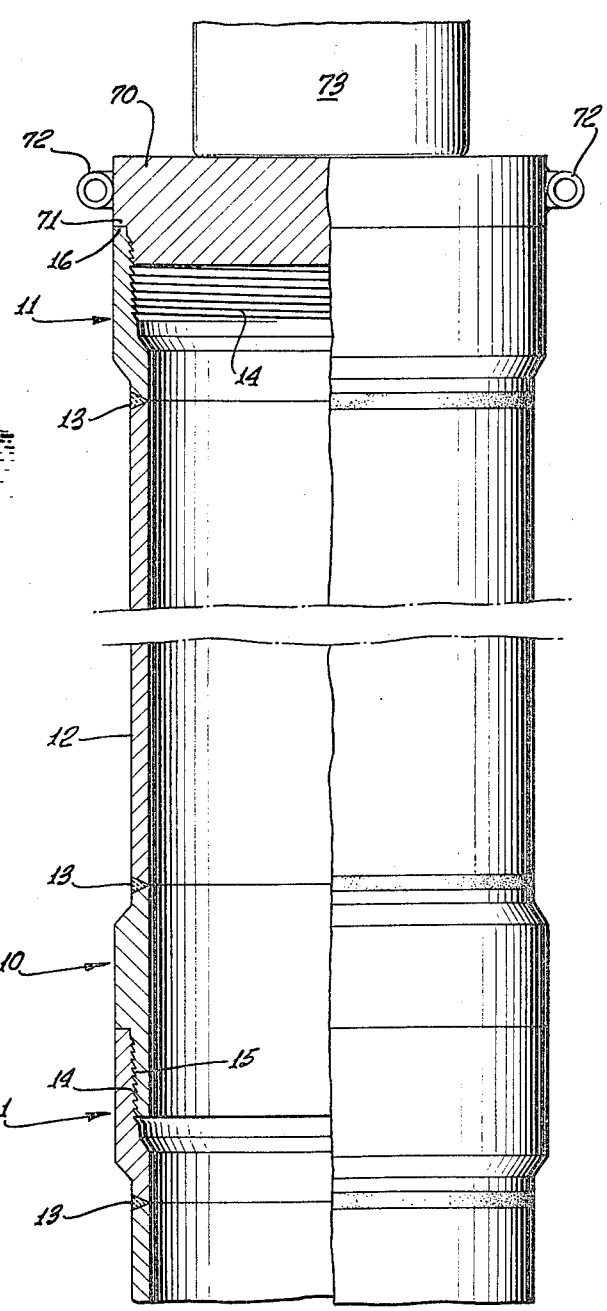
INVENTORS.
CARL F. HUNTSINGER
JAMES W. E. HANES
BY Bernard Kriegel
ATTORNEYS.

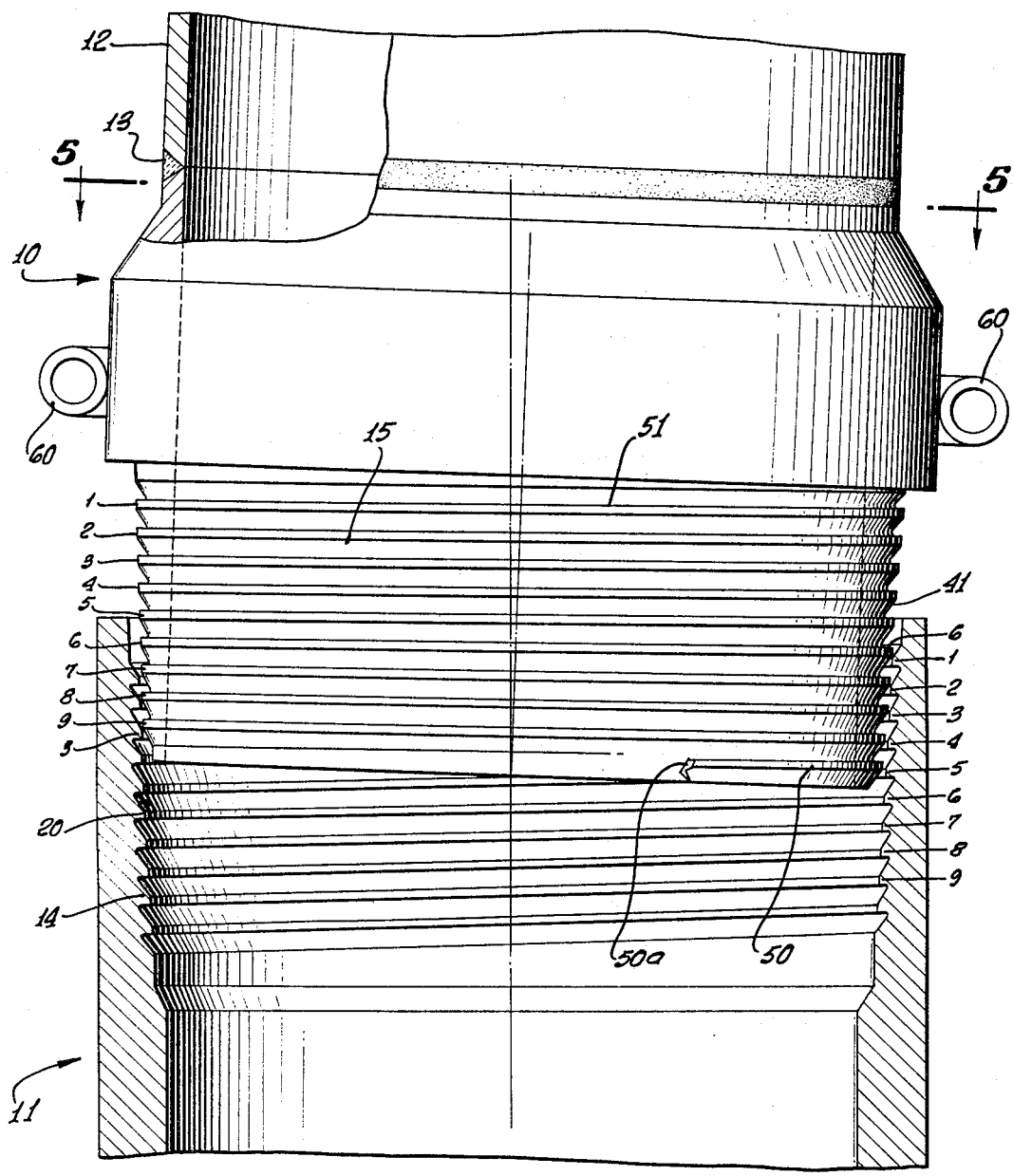

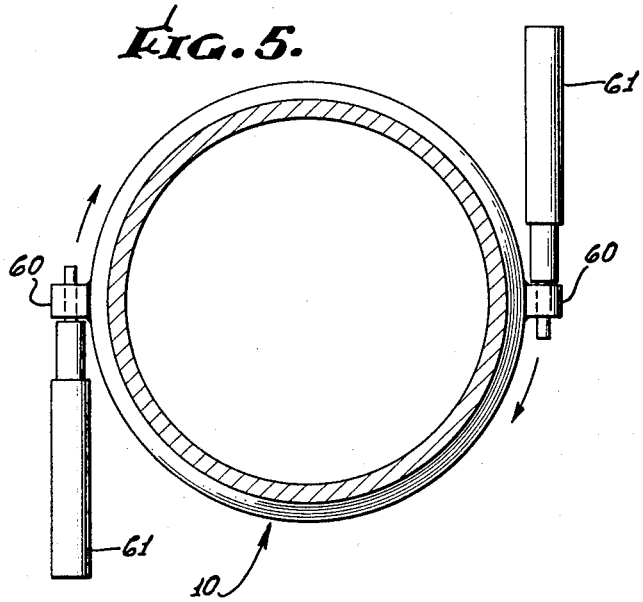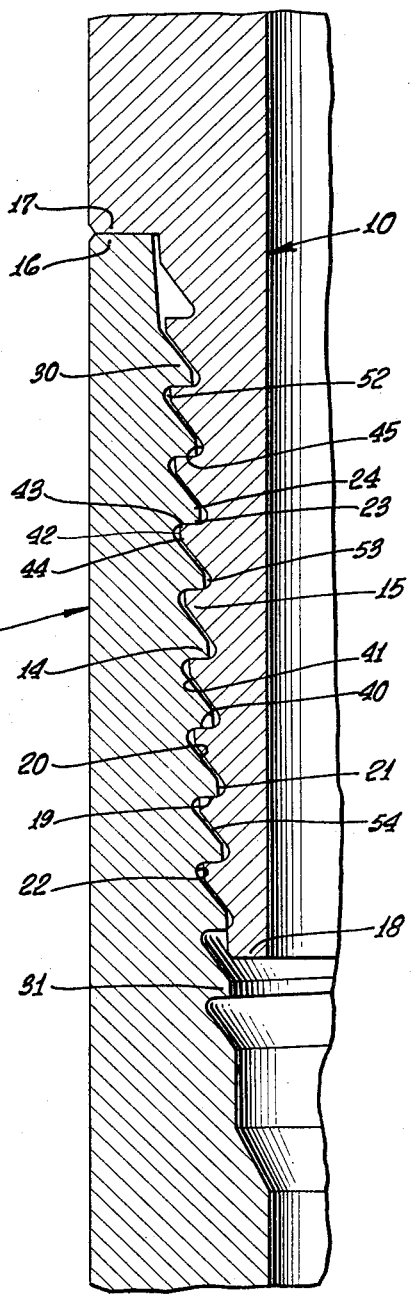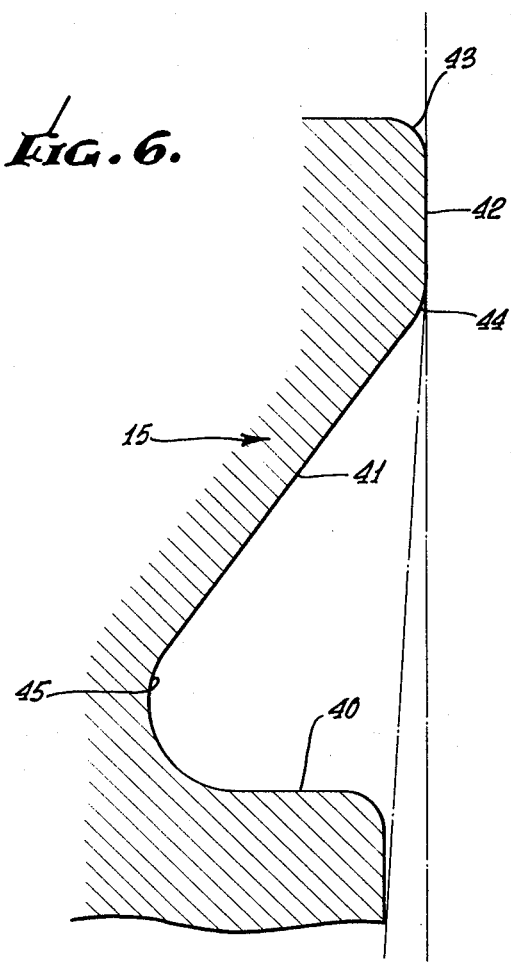

3,388,752
COMBINATION PILEDRIVER AND DRIVABLE
THREADED PIPE SECTIONS
James W. E. Hanes and Carl F. Huntsinger, Ventura,
Calif., assignors to Ventura Tool Company, Ventura,
Calif., a corporation of California
Filed July 25, 1966, Ser. No. 567,718
8 Claims. (Cl. 173—131)

The present invention relates to the driving of pipe having threaded tool joints, and more particularly to large diameter casing and conductor pipe used in the drilling of underwater wells or as anchor piles in securing structures to the ocean floor.

Heretofore, underwater tubular members of relatively large diameter have been connected to one another by welding at the rig or pile driving location. The welding method is extremely costly since several hours are required in the welding of each joint. The offshore rig time involved for each weld in the connecting of large diameter, thick wall conductor pipe may be about two to five hours, and may cost $4,000 in a typical case. Such lapsed time in the case of a pile driving operation may cause the previously driven pile sections to set prematurely before the required length of conductor has been run and driven into the floor of the ocean or other body of water, necessitating retrieval of the pile and its rerunning. If the pile cannot be retrieved, it is necessary to move the drilling rig to a new location for the purpose of starting a new hole.

Large diameter conductor pipe sections can be joined together by threaded connections known as "threaded and coupled," each of which consists of the threaded ends of adjacent pipe sections screwed into an intervening threaded coupling. For relatively small diameter pipe, such threaded connections are fairly satisfactory, but with large diameter pipe, as, for example, above 13⅜ inches in diameter and as large as 30 inches in diameter, it is extremely difficult to stab and engage the starting threads when running pipe from a platform or floating vessel, because of excessive motion between the pipe supported by the slips on the platform or vessel and the length of pipe being stabbed into the coupling. Almost perfect alignment is necessary to stab the above joint, since the taper in this type of connection is very slight. The slight angle of taper is dictated by the fact of cutting the taper in the wall of the pipe which decreases its wall thickness, and, consequently, lessens its strength. Since the taper is slight, a pin and box is produced having only a small difference in diameter between the small end of the pin and the large diameter of the box. Accordingly, as stated above, almost perfect alignment is necessary to engage the starting threads.

In lieu of threaded and coupled connections, a tool joint pin and box can be used to threadedly connect adjacent pipe sections to each other. Tool joint parts can have greater wall thicknesses, which allows their taper to be cut at a greater angle, providing a greater difference in diameter between the small end of the pin and the large entering end of the box, thereby facilitating stabbing of the pin in the box despite substantial angular misalignment.

Threaded and coupled connections, as well as tool joint pin and box connections, have tapered threads which impose a laterally outwardly directed or hoop stress on the coupling or box as a result of tightening or torquing up of the joint. In addition, the use of such tapered threads in pile driven pipe subjects the box or coupling to a large hoop stress incident to the pile driving operation, which tends to bulge the box or coupling.

For the foregoing and other reasons, threaded connections have not been used in large diameter pipes, the sections of which have been welded together, with the attendant high cost and other adverse factors, some of which have been noted above.

Accordingly, it is an object of the present invention to provide a threaded tool joint for large diameter pipe to be used in the drilling of underwater wells, or in pile driving operations, in which the threads are cut at a relatively large taper to facilitate stabbing of the pin in the box, and to reduce the number of turns necessary to fully make up the joint after the pin has been stabbed into the box, and in which the hoop stress in the box is considerably minimized, if not eliminated completely.

Another object of the invention is to provide a threaded tool joint for pipe to be used in pile driving operations, in which the threads impose minimum hoop stress on the tool joint box as a result of the impact blows imparted to the pipe by the pile driver.

A further object of the invention is to provide a pile driver and pipe combination, in which the blows imparted by the piledriver to the pipe do not impose a substantial or any hoop stress on the threaded box portions of the pipe being driven into the ocean floor, or other site, for the pile driving operation.

An additional object of the invention is to provide a threaded tool joint for large diameter conductors, in which cross threading of the pin and box threads of the joint is eliminated.

Another object of the invention is to provide an assembly of large diameter pipe or piling sections that can be threadedly attached to each other at greatly reduced assembly time, thereby reducing the cost of operating offshore rigs, and further reducing the possibility of sticking of the conductor string in a given position before it has been driven to final depth.

This invention possesses many other advantages, and has other objects which may be made more clearly apparent from a consideration of a form in which it may be embodied. This form is shown in the drawings accompanying and forming part of the preesnt specification. It will now be described in detail, for the purpose of illustrating the general principles of the invention; but it is to be understood that such detailed description is not to be taken in a limiting sence, since the scope of the invention is best defined by the appended claims.

Referrig to the drawings:

FIGURE 1 is a diagrammatic view of a string of pipe being driven into an ocen floor from a floating vessel;

FIG. 2 is a combined side elevation and longitudinal section through the upper portion of the string of pipe shown in FIG. 1, on an enlarged scale;

FIG. 3 is an enlarged elevational and sectional view illustrating the stabbing of a threaded tool joint pin into a companion threaded box;

FIG. 4 is a partial sectional view of the threaded tool joint pin fully tightened into its companion threaded box;

FIG. 5 is a cross-section taken along the line 5—5 on FIG. 3; and

FIG. 6 is an enlarged view showing the details of the pin thread.

An embodiment of the invention is illustrated in the drawings in combination with the driving of a string of marine conductor pipe A into a well bore B underlying a body of water C, the marine conductor pipe consisting of pipe sections P threadedly secured to one another and driven into the well bore from a drilling vessel D floating in the body of water. This drilling vessel has a suitable derrick E supporting a crown block F over which run suitable cables G connected to a travelling block and hook H secured to a pile driver J which is to deliver impact blows upon the string of conructor pipe A and drive it to the desired depth into the hole B being produced. The traveling block and hook H is also used for the handling of additional pipe sections that are to be connected to the pipe sections extending through and below the drilling vessel, elevation of the travelling block and its descent being under the control of a suitable hoist K connected to the cable G.

Each pipe section P has a lower tool joint pin 10 and an upper tool joint box 11 connected to an intervening length 12 of the pipe section, as through use of welding material 13. Each pipe section has its pin and box attached thereto at a suitable plant site and through use of production equipment that enables the welds 13 to be made in a comparatively rapid manner, thereby avoiding the high cost of providing welds on the drilling vessel D. The box 11 has a trapezoidal or buttress type of thread 14, the pin 10 having a like trapezoidal or buttress thread 15 adapted to be received within the box of an adjacent pipe section therebelow. The box has an upper end or shoulder 16, with its buttress thread 14 formed on a downwardly directed taper and starting a short distance inwardly from or below its upper end 16. The pin 10 has a companion shoulder 17 adapted to engage the end 16 of the box, its threads 15 also being formed on a companion taper extending downwardly to its free end 18.

The trapezoidal box threads 14 each have a driving face or flank 19 at right angles to the box axis and a back face or flank 20 making a substantial angle to the axis of the box, which, for example, may be 37½ degrees to the box axis, or 52½ degrees to the drive face 19. The crests 21 of the threads are straight and parallel to the box axis; whereas, the roots 22 of the thread are curved, being tangent to the sloping back faces 20 of the threads and to their drive faces 19. In addition, the corner 23 between each drive face 19 and flat face 21 of each thread turn is curved, which is also true of the corner 24 between the flat face 21 and each back face or flank 20 of the thread. The roots 22 and crests 21 of the box threads lie on tapers so that the uppermost thread portion 30 of the box substantially larger in diameter than the innermost thread turn 31 of the box, providing a relatively large entrance opening 30 for the companion threaded pin of an adjacent pipe section.

The external threads 15 on each pipe section pin 10 are companion to the internal threads 14 of the box. Thus, the external thread is also cut on a taper companion to the taper angle of the box, having a drive face 40 at right angles to the pin axis, a back face or flank 41 making the same angles to the drive face 40 and to the axis of the pin as the back face or flank 20 of the box makes to its drive face 19 and its axis, the crest of the threads 42 being flattened and merging through rounded corners 43, 44 into the drive face 40 and back face 41, and the roots 45 of the pin thread also being curved. Because of the taper on which the external pin threads 15 are cut, its lowermost turn 50 has a diameter substantially smaller than its uppermost turn 51, the smaller diameter of the outermost pin thread 50 being substantially less than the larger diameter of the outermost box thread 30 at its entrance.

The external and internal pin and box threads 15, 14 are so proportioned with respect to one another that when in full threaded mesh, as disclosed in FIG. 4, with the drive pin shoulder 17 abutting the upper end 16 of the box, there is a lateral clearance 52 between the crests of the pin threads and the opposed roots of the box threads, a lateral clearance 53 between the crest of the box threads and the roots of the pin threads, and also a clearance 54 between the back faces or sloping sides 41, 20 of the pin and box threads.

In view of the fact that the wall thickness of the pin and of the box at their threads are comparatively large, the threads 14, 15 can be cut on the pin and in the box having a relatively large degree of taper. As a result, the pin thread 15 can be inserted in the box thread 14 to a substantial extent before it is necessary to rotate the pin within the box, in order to thread the pin fully within the box and to bring the pin shoulder 17 into contact with the outer end 16 of the box. Rotation can take place on the floating vessel D by applying a spinning rope (not shown) to the upper pipe section, after which suitable torque can be applied to the upper pipe section to fully tighten the mating threads 14, 15 of the tool joint against one another, at which time the pin shoulder 17 will engage the box shoulder 16, these shoulders being normal to the common axis of the pin and box. When the joint is fully made up or tightened, the shoulders 16, 17 are firmly coengaged and the driving faces 40, 19 of the pin and box are snugly engaged with one another, the sloping faces 41, 20 having clearance with respect to one another, which is also true of the crest and roots of the companion threads, as illustrated in FIG. 4.

One mode of applying the required make-up torque to the joint is to have diametrically opposed lugs 60 welded to the exterior of the tool joint pin 10 above its shoulder 17. After the spinning rope has preliminarily threaded the pin substantially fully within the box, suitable tools, such as air hammers 61, can be suitably connected to or brought to bear against each lug and simultaneously operated to drive or hammer the pin 10 in a clockwise direction, and thereby fully tighten it within the box 11. The air hammers 61 are then removed and the lugs 60 may also be removed from the pin 10 through use of a suitable tool (not shown), such as a cutting torch.

The pipe sections P can be connected to one another from the driling vessel D, or drilling platform if the latter is used, and lowered through the water C to the ocean floor M. The lowermost section P may have a suitable drive shoe (not shown) thereon, and upon engaging the ocean floor, the pile driver mechanism J is used for driving the string of marine conductor pipe A into the formatioin commencing at the ocean floor. As shown in FIGS. 1 and 2, the upper box 11 of the uppermost pipe section has a drive head 70 threadedly attached to it, having a shoulder 71 engaging the upper end 16 of the box 11. This head may also have diametrically opposite drive lugs 72 welded thereto so that the head 70 can be tightened through use of the air hammers 61 previously described. The piledriver mechanism J is then lowered until it engages the piledriver head 70; whereupon, the piledriver is actuated, as by having its head contacting member 73 elevated and dropped against the head 70 to drive the string of marine conductor pipe or pile A through the ocean floor and into the formation. After the conductor pipe A has been driven downwardly a distance equivalent to the operating distance of the piledriver J, the latter may be lowered a sufficient distance by slackening off the cable G from the hoist K and allowing the travelling block and hook H to move downwardly the required distance, whereupon the pile driving actuation can continue.

Upon driving of the pile A a distance equivalent to the length of a pipe section P into the formation, the drive head 70 is unthreaded from the upper box 11, as by applying the air hammers 61 to the other sides of its lugs and imposing a counterclockwise force thereon. The traveling block and hook H are elevated and used for placing another section of pipe P into position and stabbing its tool joint pin 10 into the threaded box 11 of the section P therebelow, the new pipe section being threaded fully within the box and suitable torque applied thereto, as through use of the air hammers 61 acting upon the opposed lugs 60 on the tool joint pin 10 of the additional pipe section. The lugs 60 can be cut-off with a torch, or otherwise removed, and the drive head 70 threaded into the box 11 of the new pipe section, repeated impact blows being struck on the drive head 70 for transfer through its shoulder 17 to the box end 16, and to the entire pile, to drive the latter further into the formation.

By repeating the foregoing procedure and successively adding additional pile sections P, the conductor pipe A can be driven into the formation to the required extent, and preferably to the point of refusal.

In the driving of the pile A, the pile driving force is transmitted in a downward direction between sections P, passing from the drive pin shoulder 17 of each section to the opposed end 16 of the box of the section therebelow, both the shoulder and the box being normal to the axis of the pin and box. As a result, lateral forces are not imparted to the box 11 and no hoop stress is imposed thereon. It is to be noted that none of the driving force is transmitted through the pin and box threads 15, 14, since the tapered front flank 41 of the pin threads are out of contact with the sloping flanks 20 of the box threads. In addition, no reactive forces are transmitted in a lateral direction from the pin threads 15 to the box threads 14. Any upwardly directed forces, following a downward blow on the entire conductor pipe A, will be transmitted from the drive faces 40 of the pin threads to the opposed pressure flank faces 19 of the box threads, which contacting faces are normal to the common axis of the pin and box. Accordingly, there is a direct longitudinal reactive force transmitted between the threads 15, 14, with a complete absence of any lateral forces, and particularly lateral outward forces, that would impose an outward bulging force or hoop stress on the box 11. The absence of such stresses on the box insures the maintenance of each threaded joint in a fully torqued up condition, and results in the absence of any loosening or failure of the joints.

By virtue of the particular trapezoidal thread connection employed on the pin and box, stabbing of the pin thread 15 into the box thread 14 is relatively easy, despite misalignment that might occur therebetween, particularly when an additional pipe section P is added to the conductor pipe A already driven into the ground and extending upwardly through the drilling vessel D, which can partake of some pitch or roll. It is to be noted that a relatively large angle of taper is developed in the tool joint, which permits a maximum difference in diameters between the small end 50 of the pin and the large entering end 30 of the box. Thus, despite a substantial angle of misalignment, such as disclosed in FIG. 3, the pin thread 15 can be moved to a substantial extent into the box thread 14. In fact, the sloping upper faces 20 of the box threads coact with the pin threads to facilitate relative sliding of the pin threads along the box threads, and the bringing of the pipe section P above the box 11 into a position of axial alignment with the latter. Similarly, the sloping lower or front faces 41 of the pin threads can cooperate with the box threads 14 to permit relative downward sliding of the pin within the box and facilitate movement of the newly added pipe section into a position of alignment, and a further stabbing or insertion of the pin into the box. In FIG. 3, the pin 10 is shown with a certain angle of misalignment relative to the box 11 and having been partially inserted into the latter. Actually, the figure is for illustrative purpose, disclosing an exaggerated difference between the helix angle of the pin and box threads, since the threads and the vertical dimensions of the figure are full size; whereas, the horizontal dimensions are disclosed at approximately half size.

In FIG. 3, at the angle of misalignment disclosed, the pin threads 6 and 9 are supported by the box threads 1 and 3. As the upper pipe section P moves into a position of alignment with respect to the box 11, the pin thread 6 will move away from the box thread 1; whereas, the pin thread 9 will slide downwardly on the sloping surface 20 of the box thread 3, at which time the pin 10 can move downwardly within the box 11 to a further extent until the mating threads 15, 14 are engaged. In view of the fact that the threads 14, 15 can relatively slide upon one another, because of their configurations, it is impossible to effect a cross threaded connection. Once a condition of alignment has been achieved with the pin thread 15 inserted into the box thread 14 substantially as far as it will go, the pin can then be rotated to thread it downwardly within the box to substantially its fullest extent. To facilitate the commencement of the threading action, the lowermost starting thread 50 on the pin may be blunted, with its ends 50a tapered at the upper and lower portions. Following full threading of the pin 10 within the box 11, the final make-up torque can be applied thereto, as through use of the air hammers 61 and lugs 60 described above.

It is, accordingly, apparent that a combination of pile driving and pipe apparatus has been provided, in which the pipe sections are easily and quickly threadedly secured to one another. Each pin is readily stabbed into the companion box of an adjacent pipe section, despite angular misalignment between the pin and box. In addition, the threads can be cut at a relatively large taper, which not only facilitates the stabbing of the pin in the box, but reduces the number of turns necessary to fully make up the joint. The particular thread shape used avoids the imposition of hoop stress in the box as a result of both the make-up torque and as a result of impact blows imparted to the pipe by the piledriver. The sloping faces 20, 41 of the pipe threads and their ability to slide upon one another prevents cross threading, and thereby insures the proper make-up of the threaded tool joint. The tool joint remains tightly connected, despite repeated impact blows transmitted through it, thereby eliminating the need for welding pipe sections to one another, particularly where the pipe sections are of comparatively large diameters, which effect substantial savings in time and cost, particularly on offshore locations.

I claim:

1. In apparatus for driving pipe into a formation: a first pipe section having a box at one end portion and provided with an internal tapered thread of generally trapezoidal form; a second pipe section having a pin at one end portion and provided with an external tapered thread of generally trapezoidal form companion to and adapted to mesh with said internal tapered thread; said pin having a drive shoulder engaging the outer end of said box when said pin is fully tightened within said box, said shoulder and outer end being normal to the common axis of said pin and box; said pin thread having a drive face normal to the axis of said pin, a back face inclined to said drive face and a flat crest between said faces substantially parallel to said pin axis; said box thread having a drive face normal to the axis of said box, a back face inclined to said drive face of said box, and a flat crest between said faces of said box substantially parallel to said box axis; said drive faces engaging each other when said pin shoulder and box end engage each other, said inclined back faces being free from contact with each other when said pin shoulder and box end are coengaged; the crest of said pin thread and box thread having clearance with the roots of said box thread and pin thread, respectively; and means for subjecting said pipe sections to longitudinally directed impacts to drive at least one of said sections into the formation.

2. In apparatus for driving pipe into a formation as defined in claim 1; wherein the root portions of said threads are concavely curved.

3. In apparatus for driving pipe into a formation as defined in claim 1; wherein the root portions of said threads are concavely curved, each thread having a convexly curved corner between its flat face and its drive face, and also having a convexly curved corner between its flat face and its inclined back face.

4. In apparatus for driving pipe into a formation as defined in claim 1; wherein each pipe section has one of said pins at one end and one of said boxes at its other end.

5. In apparatus for driving pipe into a formation as defined in claim 1; wherein the root portions of said threads are concavely curved, each thread having a convexly curved corner between its flat face and its drive face, and also having a convexly curved corner between its flat face and its inclined back face; each pipe section having one of said pins at one end and one of said boxes at its other end.

6. In a tool joint for connecting pipe sections together: a box member provided with an internal tapered thread of generally trapezoidal form; a pin member provided with an external tapered thread of generally trapezoidal form companion to and adapted to mesh with said internal tapered thread; said pin member having a drive shoulder engaging the outer end of said box member when said pin member is fully tightened within said box member, said shoulder and end being normal to the common axis of said pin member and box member; said pin member thread having a drive face normal to the axis of said pin member, a back face inclined to said drive face and a flat crest between said faces substantially parallel to said pin member axis; said box member thread having a drive face normal to the axis of said box member, a back face inclined to said drive face of said box member and a flat crest between said faces of said box member substantially parallel to said box axis; said drive faces engaging each other when said pin member shoulder and the box member end engage each other, said inclined back faces being free from contact with each other when said pin member shoulder and box member end are coengaged; the crest of said pin member thread and box member thread having clearance with the roots of said box member thread and pin member thread, respectively.

7. In a tool joint for connecting pipe sections together as defined in claim 6; wherein the root portions of said threads are concavely curved.

8. In a tool joint for connecting pipe sections together as defined in claim 6; wherein the root portions of said threads are concavely curved; each thread having a convexly curved corner between its flat face and drive face, and also having a convexly curved corner between its flat face and inclined back face.

References Cited

UNITED STATES PATENTS

| 2,111,196 | 3/1938 | Texter | 285—334 X |
| 3,047,316 | 7/1962 | Wehring et al. | 285—334 |
| 3,050,318 | 8/1962 | Van Der Wissel | 285—334 |
| 3,109,672 | 11/1963 | Franz | 285—334 |
| 3,355,192 | 11/1967 | Kloesel et al. | 85—46 X |
| 3,359,013 | 12/1967 | Knox et al. | 285—334 X |

FOREIGN PATENTS

| 715,294 | 12/1941 | Germany. |
| 946,525 | 8/1956 | Germany. |

CHARLES E. O'CONNELL, *Primary Examiner.*

DAVID H. BROWN, *Examiner.*